US012650744B2

(12) United States Patent
Kwon et al.

(10) Patent No.: US 12,650,744 B2
(45) Date of Patent: Jun. 9, 2026

(54) SENSOR DEVICE AND IMAGE DISPLAY DEVICE INCLUDING THE SAME

(71) Applicant: DONGWOO FINE-CHEM CO., LTD., Jeollabuk-do (KR)

(72) Inventors: Do Hyoung Kwon, Jeollabuk-do (KR); Yoon Ho Huh, Jeollabuk-do (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 0 days.

(21) Appl. No.: 18/911,352

(22) Filed: Oct. 10, 2024

(65) Prior Publication Data

US 2025/0123704 A1     Apr. 17, 2025

(30) Foreign Application Priority Data

Oct. 11, 2023     (KR) ......................... 10-2023-0134943

(51) Int. Cl.
*G06F 3/041* (2006.01)
(52) U.S. Cl.
CPC ................................ *G06F 3/04164* (2019.05)
(58) Field of Classification Search
None
See application file for complete search history.

(56) References Cited

U.S. PATENT DOCUMENTS

| | | |
|---|---|---|
| 2013/0240341 A1 | 9/2013 | Lo et al. |
| 2022/0027013 A1 | 1/2022 | Kim et al. |
| 2023/0163456 A1 | 5/2023 | Choi et al. |
| 2023/0168756 A1 * | 6/2023 | Lee .......................... H01Q 1/48 |
| | | 345/174 |

FOREIGN PATENT DOCUMENTS

| | | | |
|---|---|---|---|
| KR | 10-2003-0095557 A | 12/2003 | |
| KR | 10-2011-0101026 A | 9/2011 | |
| KR | 10-2014-0092366 A | 7/2014 | |
| WO | WO-2020204622 A1 * | 10/2020 | ........... G06F 1/1698 |

OTHER PUBLICATIONS

Translation of WO-2020204622-A1 into English; Kim et al. (Year: 2020).*
Notice of Allowance issued on Jul. 8, 2025 from Japan Intellectual Property Office in a counterpart Japanese Patent Application No. 2024-178394 (English translation is also submitted herewith.).

* cited by examiner

*Primary Examiner* — Brian M Butcher
(74) *Attorney, Agent, or Firm* — The PL Law Group, PLLC

(57)     ABSTRACT

A sensor device includes touch sensing electrodes, traces extending from the touch sensing electrodes, touch sensor pads connected to the traces, an antenna unit disposed adjacent to the touch sensing electrodes and including a radiator, a transmission line connected to the radiator, and ground lines extending around the transmission line, and antenna pads forming a pad row together with the touch sensor pads, and including a signal pad connected to the transmission line and ground pads connected to the ground lines.

18 Claims, 8 Drawing Sheets

FIG. 2

SENSOR DEVICE AND IMAGE DISPLAY DEVICE INCLUDING THE SAME

CROSS REFERENCE TO RELATED APPLICATION AND CLAIM OF PRIORITY

This application claims the benefit under 35 USC § 119 of Korean Patent Application No. 10-2023-0134943 filed on Oct. 11, 2023, in the Korean Intellectual Property Office, the entire disclosure of which is incorporated herein by reference for all purposes.

BACKGROUND

1. Field of the Invention

The present invention relates to a sensor device and an image display device including the same, and more specifically, to a sensor device which includes sensing electrodes and pads, and an image display device including the sensor device.

2. Description of the Related Art

Recently, according to development of the information-oriented society, wireless communication techniques such as Wi-Fi, Bluetooth, and the like are implemented, for example, in a form of smartphones by combining with image display devices. In this case, an antenna may be coupled to the image display device to perform a communication function.

Recently, with mobile communication techniques becoming more advanced, an antenna for performing high frequency or ultra-high frequency communication corresponding to 3G to 5G or higher, for example, may be coupled to the image display device.

Meanwhile, electronic devices, in which a touch panel or a touch sensor as an input device for allowing a user to select instructions displayed on a screen by his or her finger or an object such as a touch pen and input his or her command is coupled with the image display device to implement an image display function and an information input function together, have been developed. For example, as disclosed in Korean Patent Laid-Open Publication No. 2014-0092366, a touch screen panel, in which a touch sensor is coupled to various image display devices, has been developed.

When the antenna structure is disposed together with the touch sensor, signal interference between the antenna and the touch sensing electrode may occur. In addition, separate circuit connection structures (e.g., a plurality of circuit boards) for performing power supply to the antenna structure and the touch sensor, respectively, are required.

For example, Korean Patent Laid-Open Publication No. 2003-0095557 discloses an antenna structure built into a portable terminal, but it fails to consider consistency with other electrical devices such as a touch sensor.

SUMMARY

An aspect of the present invention is to provide a sensor device having improved reliability and efficiency of signal transmission and reception.

Another aspect of the present invention is to provide an image display device including the sensor device having improved reliability and efficiency of signal transmission and reception.

To achieve the above aspects, the following technical solutions are adopted in the present invention.

1. A sensor device including: touch sensing electrodes; traces which extend from the touch sensing electrodes; touch sensor pads which are connected to the traces; an antenna unit which is disposed adjacent to the touch sensing electrodes and comprises a radiator, a transmission line connected to the radiator, and ground lines extending around the transmission line; and antenna pads which form a pad row together with the touch sensor pads, and comprise a signal pad connected to the transmission line and ground pads connected to the ground lines.

2. The sensor device according to the above 1, wherein a pair of the ground lines face each other with the transmission line interposed therebetween.

3. The sensor device according to the above 1, wherein the transmission line and the ground lines have a bent line shape, respectively.

4. The sensor device according to the above 1, wherein the transmission line comprises an extended line part whose width is increased at an end adjacent to the radiator.

5. The sensor device according to the above 1, wherein the ground line comprises an extended ground part whose width is increased at an end adjacent to the radiator.

6. The sensor device according to the above 1, wherein the ground pad is disposed between the signal pad and the touch sensor pad.

7. The sensor device according to the above 1, wherein a plurality of antenna units are arranged in a row direction, and the signal pad and the ground pad are independently connected to each of the antenna units through the transmission line and the ground lines.

8. The sensor device according to the above 7, wherein at least one touch sensor pad among the touch sensor pads is disposed between the antenna pads connected to adjacent antenna units among the antenna units.

9. The sensor device according to the above 7, wherein the transmission lines connected to each of the plurality of antenna units have a bent line shape with the same length, respectively.

10. The sensor device according to the above 1, wherein the antenna pad and the touch sensor pads form a single pad row on the same layer.

11. The sensor device according to the above 1, wherein the transmission line of the antenna unit comprises a first transmission line and a second transmission line which extend in different directions from each other and are connected to the radiator, and the signal pad is connected to each of the first transmission line and the second transmission line.

12. The sensor device according to the above 1, further comprising an antenna driving integrated circuit which is electrically connected with the antenna unit, and is configured to apply a reference potential to the ground pad, and apply a power supply signal having a potential greater than the reference potential to the signal pad.

13. The sensor device according to the above 12, further comprising a blocking pad inserted between the adjacent touch sensor pads among the touch sensor pads or a guard pad disposed at an end of the pad row.

14. The sensor device according to the above 13, further comprising a touch sensor driving integrated circuit which is electrically connected with the touch sensor pads, and is configured to apply a reference potential to the blocking pad or the guard pad, and apply a touch driving signal having a potential greater than the reference potential to the touch sensor pad.

15. The sensor device according to the above 14, wherein the reference potential applied to the blocking pad or the guard pad and the reference potential applied to the ground pad are the same as each other.

16. The sensor device according to the above 13, further comprising a blocking line extending between adjacent traces among the traces from the blocking pad.

17. The sensor device according to the above 13, further comprising a guard line in the form of a loop extending from the guard pad and surrounding the periphery of the touch sensing electrodes.

18. An image display device including: a display panel; and the sensor device according to the above-described embodiments, which is arranged in the display panel.

According to embodiments of the present invention, the radiator and the sensing electrodes may be disposed together in the active area of the sensor device, thereby improving space efficiency. In addition, the touch sensor pads and the antenna pads are disposed together in the bonding area, such that power supply/signal transmission may be performed through one circuit board.

In exemplary embodiments, the antenna unit includes a transmission line and ground lines, and the antenna pads may include an antenna signal pad connected to the antenna unit through the transmission line and antenna ground pads connected to the ground lines. In this case, the antenna ground pad may be arranged adjacent to the touch sensor pads to block interference/noise between the touch sensing signal and the antenna signal.

Accordingly, the touch sensor driving and antenna power supply may be independently performed together using one circuit board through the bonding area.

BRIEF DESCRIPTION OF THE DRAWINGS

The above and other aspects, features and other advantages of the present invention will be more clearly understood from the following detailed description taken in conjunction with the accompanying drawings, in which:

FIG. 2 is a schematic cross-sectional view illustrating a touch sensing electrode structure of the sensor device according to exemplary embodiments;

DETAILED DESCRIPTION

Figure 1:
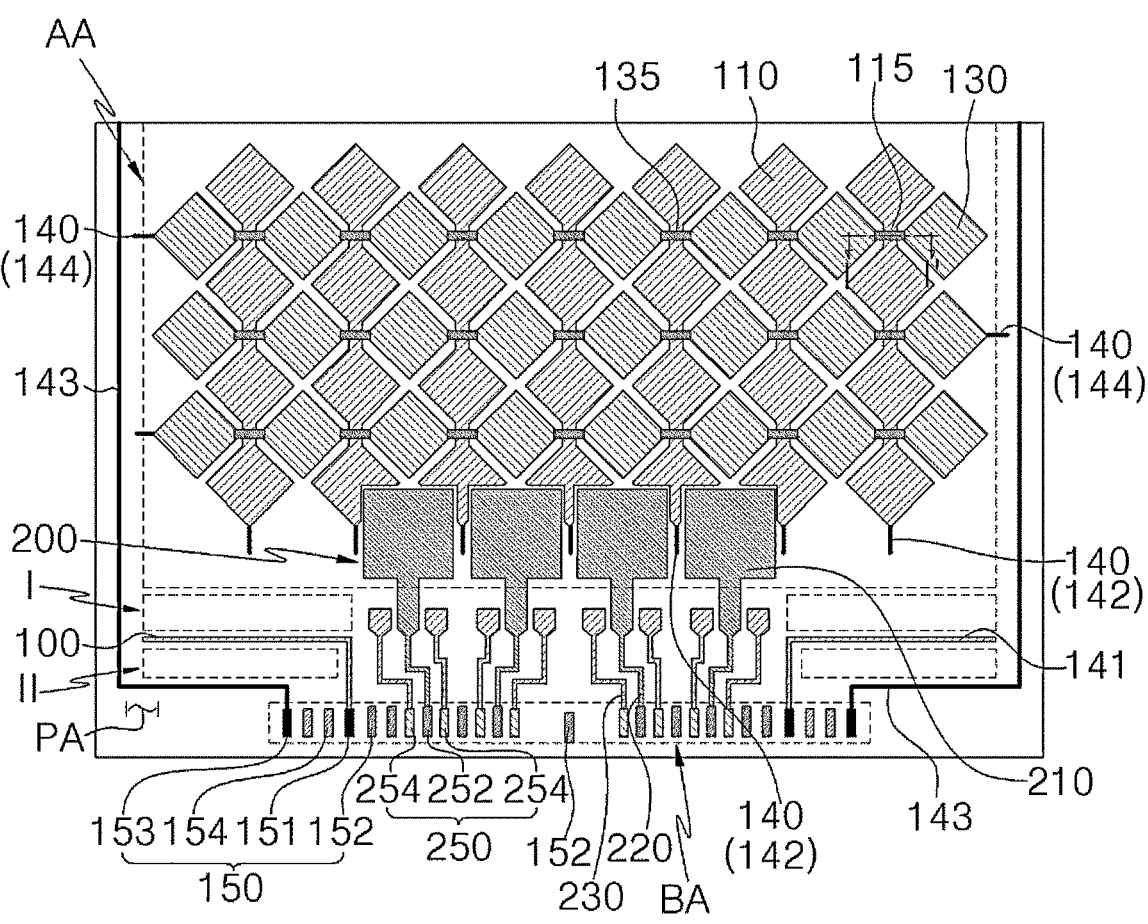
FIG. 1 is a schematic plan view illustrating a sensor device according to exemplary embodiments.

Embodiments of the present invention provide a sensor device including an antenna unit and sensing electrodes. In addition, there is provided an image display device including the sensor device.

The antenna unit may be, for example, a microstrip patch antenna manufactured in the form of a transparent film. The sensor device including the antenna unit may be applied to, for example, a communication device for high frequency or ultra-high frequency (e.g., 3G, 4G, 5G or higher) mobile communication. However, the use of the sensor device is not limited only to the image display device, and the sensor device may be applied to various structures such as a vehicle, a home appliance, a building and the like.

Hereinafter, preferred embodiments of the present invention will be described in detail with reference to the accompanying drawings. However, since the drawings attached to the present disclosure are only given for illustrating one of several preferred embodiments of present invention to easily understand the technical spirit of the present invention with the above-described invention, it should not be construed as limited to such a description illustrated in the drawings.

The terms "first," "second," "one surface," "the other surface," "one end," "the other end," "upper side," "lower side," "upper portion," "lower portion," "column direction," "row direction," and the like as used herein do not limit the absolute position or order, but are used in a relative sense to distinguish different components or portions.

The term "row direction" as used herein may correspond to a width direction parallel to an active surface or display surface of a sensor device or an image display device. The term "column direction" may be a length direction parallel to the active surface or the display surface, and may be a direction perpendicular to the row direction.

Figure 2:
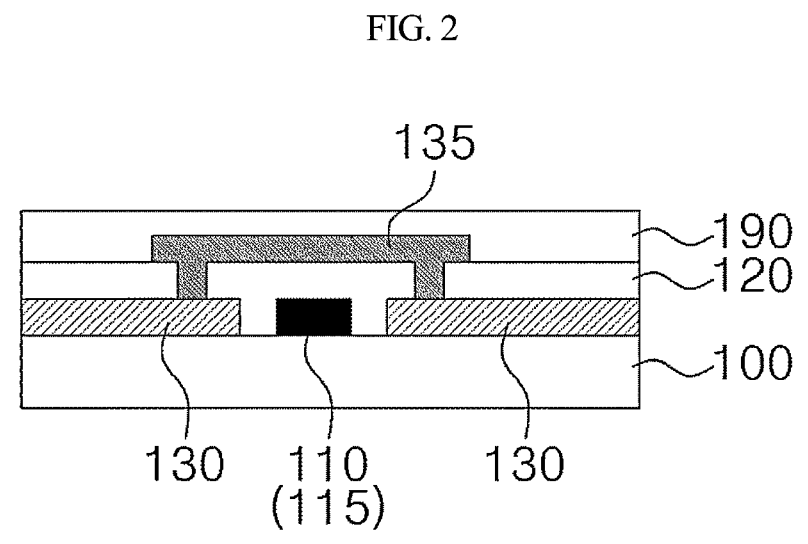

FIG. 1 is a schematic plan view illustrating a sensor device according to exemplary embodiments. FIG. 2 is a schematic cross-sectional view illustrating a touch sensing electrode structure of the sensor device according to exemplary embodiments. FIG. 2 is a cross-sectional view taken on line I-I' of FIG. 1 in a thickness direction.

For the convenience of illustration, detailed connection forms of traces 140 are not shown in FIG. 1.

Referring to FIGS. 1 and 2, the sensor device may include a substrate layer 100, touch sensing electrodes 110 and 130 (hereinafter, abbreviated as sensing electrodes) and an antenna unit 200 which are disposed on the substrate layer 100.

The substrate layer 100 may include a support layer, an interlayer insulation layer or a film type substrate for forming the sensing electrodes 110 and 130 and the antenna unit 200. For example, the substrate layer 100 may also be provided as a dielectric layer of the antenna unit 200.

For example, the substrate layer 100 may include a transparent resin film including a polyester resin such as polyethylene terephthalate, polyethylene isophthalate, polyethylene naphthalate, polybutylene terephthalate, etc.; a cellulose resin such as diacetyl cellulose, triacetyl cellulose, etc.; a polycarbonate resin; an acrylic resin such as polymethyl (meth)acrylate, polyethyl (meth)acrylate, etc.; a styrene resin such as polystyrene, acrylonitrile-styrene copolymer, etc.; a polyolefin resin such as polyethylene, polypropylene, cyclic polyolefin or polyolefin having a norbornene structure, ethylene-propylene copolymer, etc.; a vinyl chloride resin; an amide resin such as nylon, aromatic polyamide; an imide resin; a polyether sulfonic resin; a sulfonic resin; a polyether ether ketone resin; a polyphenylene sulfide resin; a vinylalcohol resin; a vinylidene chloride resin; a vinylbutyral resin; an allylate resin; a polyoxymethylene resin; an epoxy resin; a urethane or acrylic urethane resin, a silicone resin and the like. These may be used alone or in combination of two or more thereof.

In some embodiments, the substrate layer 100 may include an adhesive film, such as an optically clear adhesive (OCA), an optically clear resin (OCR) and the like.

In some embodiments, the substrate layer 100 may include an inorganic insulation material such as a silicon oxide, silicon nitride, silicon oxynitride, glass and the like.

In one embodiment, the substrate layer 100 may be provided as a substantial single layer.

In one embodiment, the substrate layers 100 may each include a multilayer structure of two or more layers. For example, the substrate layer 100 may include a lower substrate and a dielectric layer, and may include an adhesive layer between the lower substrate and the dielectric layer.

An impedance or inductance for the antenna unit 200 is formed by the substrate layer 100, thus to adjust a frequency band which can be driven or sensed by the antenna unit 200. In some embodiments, the dielectric constant of the substrate layer 100 may be adjusted to a range of about 1.5 to 12. When the dielectric constant exceeds about 12, a driving frequency is excessively reduced, such that driving of the antenna in a high frequency band may not be implemented.

In one embodiment, a ground layer (not shown) may be disposed under a lower surface of the substrate layer 100.

In one embodiment, a conductive member of an image display device or display panel to which the sensor device is applied may be provided as the ground layer.

For example, the conductive member may include electrodes or wirings such as a gate electrode, source/drain electrodes, a pixel electrode, a common electrode, a data line, a scan line, and the like included in a thin film transistor (TFT) array panel.

In one embodiment, a metallic member such as a stainless steel (SUS) plate, a sensor member such as a digitizer, a heat radiation sheet, etc., disposed on a back portion of the image display device may be provided as the ground layer.

The substrate layer 100 may include, on an upper surface thereof, an active area AA and a peripheral area PA around the active area AA. The sensing electrodes 110 and 130 and the antenna unit 200 may be arranged on the active area AA of the substrate layer 100. According to exemplary embodiments, the sensing electrodes 110 and 130 and the antenna unit 200 may be disposed at the same level as the upper surface of the substrate layer 100.

The sensing electrodes 110 and 130 may be disposed on the upper surface of the substrate layer 100 in the active area AA portion. When a touch is input form a user into the active area AA, a change in electrostatic capacity may occur by the sensing electrodes 110 and 130. Accordingly, a physical touch may be converted into an electrical signal to perform a predetermined sensing function.

The sensing electrodes 110 and 130 may include first sensing electrodes 110 and second sensing electrodes 130. The first sensing electrodes 110 and the second sensing electrodes 130 may be arranged in a direction intersecting each other. The first sensing electrodes 110 and the second sensing electrodes 130 may be positioned in the same layer or at the same level as each other on the upper surface of the substrate layer 100.

For example, the first sensing electrodes 110 may be arranged in a column direction (e.g., a Y direction). The first sensing electrodes 110 may be connected with each other in the column direction through a mergence part 115. The mergence part 115 may be integrally connected with the first sensing electrodes 110 to be provided as a substantial single member.

When a plurality of first sensing electrodes 110 are connected by the mergence parts 115, sensing channel columns extending in the column direction may be defined. In addition, a plurality of the sensing channel columns may be arranged in a row direction (e.g., an X direction).

The second sensing electrodes 130 may be arranged in the row direction. Each of the second sensing electrodes 130 may have an island pattern shape spaced apart from each other. The second sensing electrodes 130 adjacent to each other in the row direction may be electrically connected with each other by a bridge electrode 135.

For example, a pair of second sensing electrodes 130, which are adjacent to each other with the mergence part 115 included in the sensing channel columns interposed therebetween, may be electrically connected with each other by the bridge electrode 135. Accordingly, a plurality of sensing channel rows may be defined by the second sensing electrodes 130 and the bridge electrode 135 connected in the row direction. In addition, the plurality of the sensing channel rows may be arranged in the column direction.

As shown in FIG. 2, an interlayer insulation layer 120 which covers the first and second sensing electrodes 110 and 130 is formed, and the bridge electrode 135 may penetrate the interlayer insulation layer 120 to connect the adjacent second sensing electrodes 130.

In some embodiments, a protective layer 190 which covers the bridge electrode 135 may be formed on the interlayer insulation layer 120. The interlayer insulation layer 120 and the protective layer 190 include the above-described resin material or inorganic insulation material, and may cover the sensing electrodes 110 and 130 and the antenna units 200 together. The interlayer insulation layer 120 and the protective layer 190 may be removed in a bonding area BA, such that the pads are exposed to an outside.

In FIG. 1, it is illustrated that each of the sensing electrodes 110 and 130 has a rhombus pattern shape, but the shapes of the sensing electrodes 110 and 130 may be appropriately changed in consideration of the pattern density, consistency with optical characteristics of the image display device, arrangement of the antenna units 200 and the like. For example, the sensing electrodes 110 and 130 may be formed to have a wavy edge.

In FIG. 1, it is illustrated that column-directional sensing electrodes are integrally connected with each other by the mergence parts, and row-directional sensing electrodes are connected with each other by the bridge electrodes, however, the column direction and the row direction are used relatively to refer to two other intersecting directions, and it is not intended to limit them to a specific direction.

In addition, the number of sensing channel rows and sensing channel columns shown in FIG. 1, and the number of sensing electrodes included therein are only partially shown for the convenience of description, and may be expanded according to an area of the active area AA.

An area of the upper surface of the substrate layer 100 except for the active area AA may be defined as a peripheral area PA. The peripheral area PA may be defined as an area which at least partially surrounds the periphery of the active area AA. The peripheral area PA may include a bezel area of the image display device, and may include the bonding area BA in which the pads are arranged. The active area AA may be overlapped with a display area of the image display device.

The sensor device may further include traces 140 and touch sensor pads 150.

The traces 140 may be branched from each sensing channel row and sensing channel column to extend on the peripheral area PA. The traces 140 may include first traces 142 which are branched from the sensing channel columns and second traces 144 which are branched from the sensing channel rows. The traces 140 may include a conductive material and/or lamination structure substantially the same as or similar to the sensing electrodes 110 and 130.

In some embodiments, the second traces 144 may be arranged in accordance with a double-routing manner. The second traces 144 may be alternately distributed on both sides of the peripheral area PA in the row direction.

For example, the second traces 144 may be arranged alternately in the column direction on the both sides. A second trace 144 may be branched from an end on one side of a sensing channel row among the sensing channel rows, and another second trace 144 may be branched from an end on a side opposite the one side of another sensing channel row adjacent to the sensing channel row.

By the above-described double-routing arrangement, a sufficient active area AA area may be secured while reducing the area of the peripheral area PA on both sides. In addition, by reducing a deviation in the length of the second traces 144, resistance/sensing uniformities may be improved. Further, by distributing the conductive lines on both sides, a stress due to folding of the sensor device may be uniformly dispersed.

In some embodiments, the first traces 142 may be branched from one end of each of the sensing channel columns adjacent to the bonding area BA. Accordingly, the length of the first traces 142 may be decreased, thereby increasing sensing/signal transmission speeds.

In one embodiment, some of the first traces 142 may be branched from the other end of the sensing channel column and extend to the bonding area BA.

As shown in FIGS. 1 and 2, the sensing electrodes 110 and 130 may be arranged in accordance with mutual capacitance manner.

In some embodiments, the sensing electrodes 110 and 130 may also be arranged in accordance with a self-capacitance manner. In this case, each of the sensing electrodes 110 and 130 may have an independent island pattern shape, and the traces 140 may be branched from each of sensing electrodes 110 and 130 having the island pattern shape. In addition, the mergence part 115 and the bridge electrode 135 may be omitted.

The traces 140 may extend on the peripheral area PA and may be collected in the bonding area BA. Touch sensor pads 150 which are connected to distal ends of the traces 140 may be disposed within the bonding area BA.

The touch sensor pads 150 may include first touch sensor pads 152 electrically connected with each of the sensing channel columns through the first traces 142 and second touch sensor pads 154 electrically connected with each of the sensing channel rows through the second traces 144.

In exemplary embodiments, the touch sensor pads 150 may further include a blocking pad 151 and a guard pad 153. The blocking pad 151 and the guard pad 153 may not be electrically or physically connected with the traces 140.

For the convenience of description, FIG. 1 shows that the blocking pad 151 and the guard pad 153 are included together in the touch sensor pad 150. However, the blocking pad 151 and the guard pad 153 are not connected with the touch sensing electrodes 110 and 130, and the first and second touch sensor pads 152 and 154, and are arranged independently, but may be included in a configuration which enhances the reliability of touch sensing/driving.

The blocking pad 151 may be disposed between the first touch sensor pad 152 and the second touch sensor pad 154 adjacent to each other. For example, a plurality of first touch sensor pads 152 may be arranged in the row direction to form a first touch pad row, and a plurality of second touch sensor pads 154 may be arranged in the row direction to form a second touch pad row. The blocking pad 151 may be inserted between the first touch pad row and the second touch pad row.

The independence of current and signal in the sensing channel row and the sensing channel column is enhanced by the blocking pad 151, and mutual interference between a drive current and a receiving current may be prevented.

The guard pad 153 may be disposed at an end of the pad row arranged in the bonding area BA. For example, the guard pad 153 may be the outermost pad included in the pad row.

In some embodiments, the guard pads 153 may be disposed at both ends of the pad row.

According to exemplary embodiments, a blocking line 141 and a guard line 143 may be connected to blocking pads 151 and the guard pads 153, respectively. The blocking line 141 and the guard line 143 may extend from the blocking pads 151 and the guard pads 153, respectively, within the peripheral area PA.

As shown in FIG. 1, a first area I in which the first traces 142 extend in the row direction and a second area II in which second traces 144 extend in the row direction may be divided by the blocking line 141. Due to the blocking line 141, signal collisions between the first traces 142 and the second traces 144 may be prevented, and mutual interference between the drive current and the receiving current may be prevented.

The guard line 143 may extend to at least partially surround the active area AA. For example, the guard line 143 may extend continuously between the guard pads 153 disposed at both ends of the pad row to form a loop. Accordingly, mutual interference between a touch signal and an external noise in the active area AA may be reduced/blocked overall.

The antenna unit 200 may include a radiator 210, a transmission line 220 and ground lines 230.

For example, the radiator 210 may have a polygonal plate shape.

For example, the transmission line 220 may have a width smaller than that of the radiator 210 and may be connected with one end or one side of the radiator 210. The radiator 210 and the transmission line 220 may be formed as a single member integrally connected with each other.

A target resonance frequency of the antenna unit 200 may be adjusted depending on the shape/size of the radiator 210. For example, the radiator 210 may be designed to radiate radio waves in a high frequency/ultra-high frequency band of 3G, 4G, 5G or higher. For example, a radiation band of a frequency band of about 0.5 GHz or higher, about 1 GHz or higher, about 10 GHz or higher, about 20 GHz or higher, about 30 GHz or higher, or about 40 GHz or higher may be implemented through the radiator 210.

The ground lines 230 may be disposed around the transmission line 220. For example, a pair of ground lines 230 may be disposed to face each other with the transmission line 220 interposed therebetween. The ground line 230 may be physically and electrically separated from the radiator 210 and the transmission line 220.

Antenna pads 250 may be arranged together with the touch sensor pads 150 within the bonding area BA. Antenna power supply/driving signals for the antenna units 200 or radiator 210 may be transmitted from the antenna pads 250 to the transmission lines 220.

According to exemplary embodiments, the touch sensor pads 150 and the antenna pads 250 may form a single row of pads at one end of the sensor device. The antenna pad 250 may include a signal pad 252 and ground pads 254.

Figure 3:
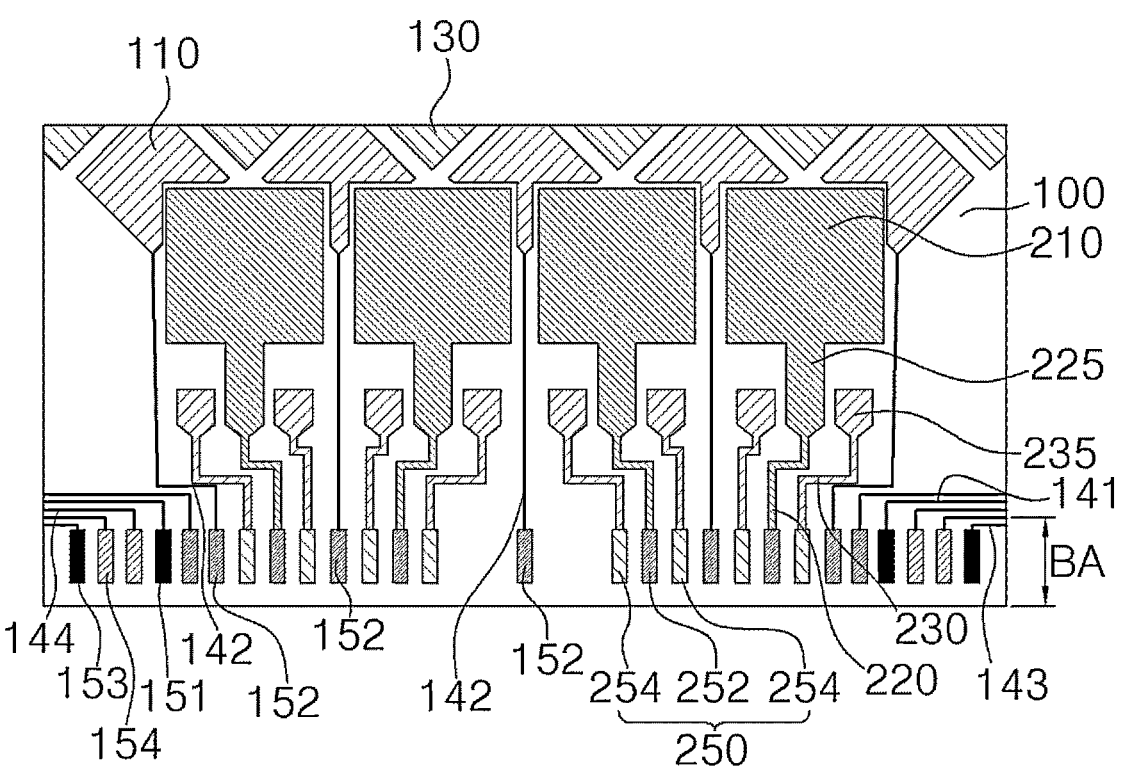
FIGS. 3 and 4 are partially enlarged plan views illustrating the sensor device according to exemplary embodiments.
Figure 4:
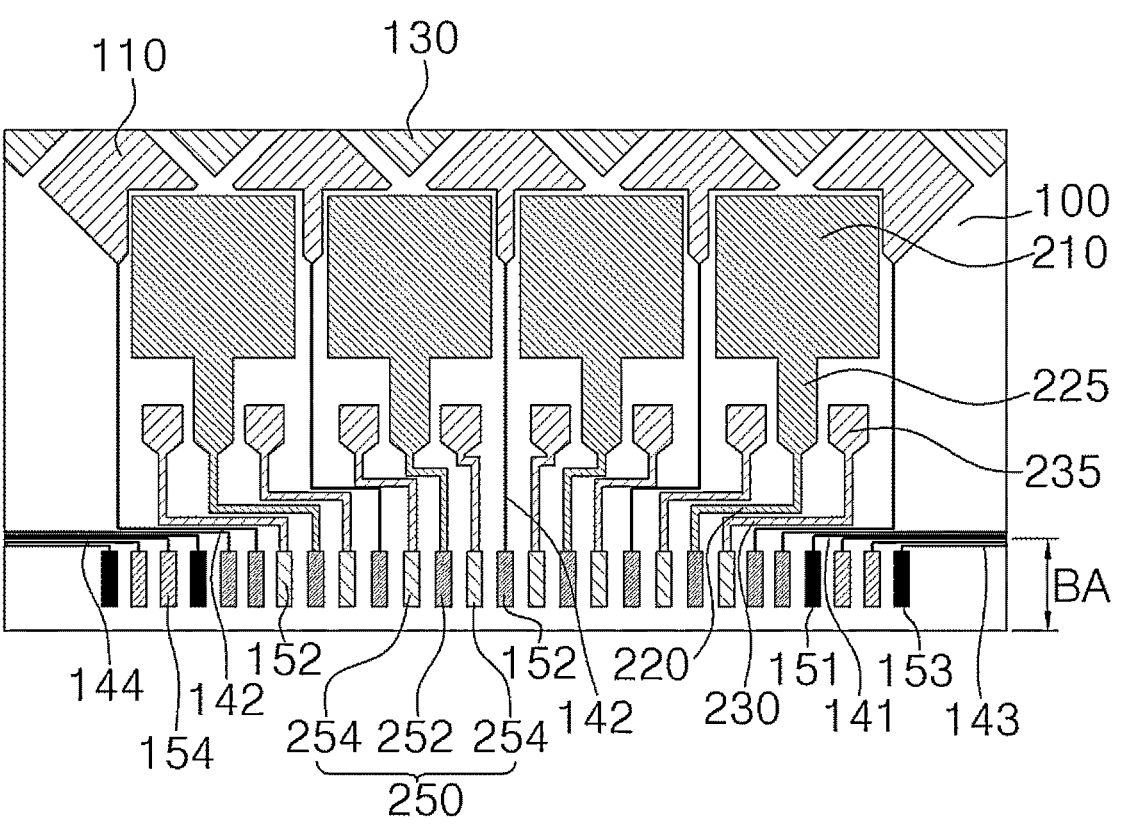
Figure 5:
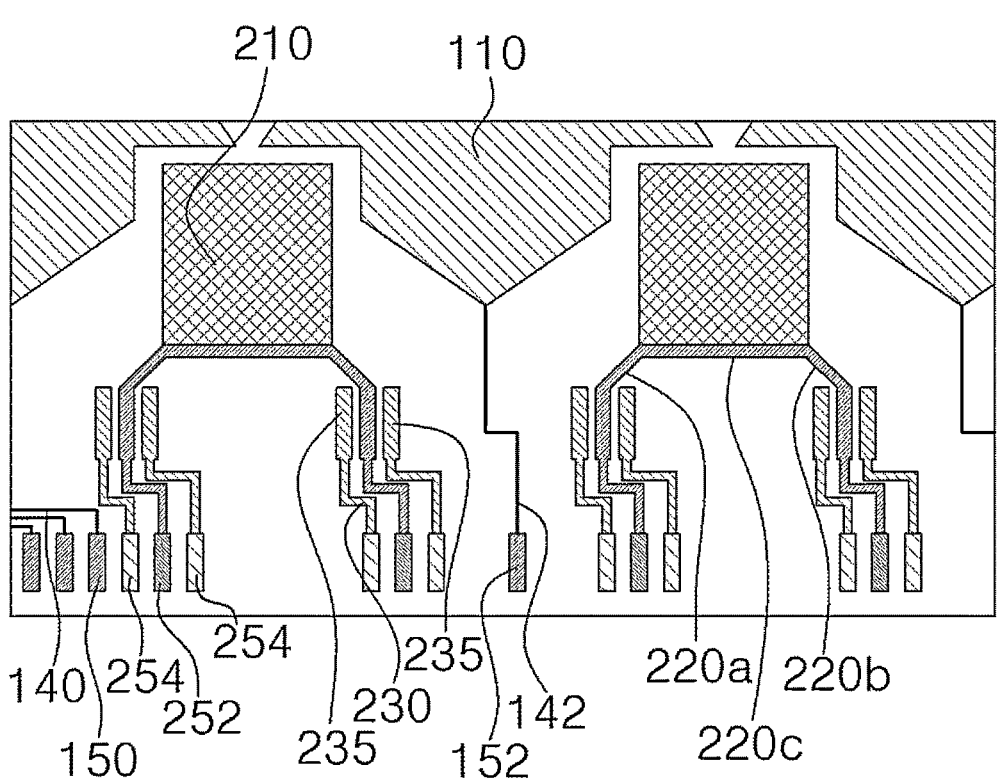
FIG. 5 is a schematic partially enlarged plan view illustrating a sensor device according to some exemplary embodiments.

The connection/arrangement structure of the antenna pad 250 and the antenna unit 200 is described in more detail in FIGS. 3 to 5.

The sensing electrodes 110 and 130, the traces 140 and/or the antenna unit 200 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn) or an alloy containing at least one of these. These may be used alone or in combination of two or more.

In one embodiment, the sensing electrodes 110 and 130, the traces 140 and/or the antenna unit 200 may include silver (Ag) or a silver alloy (e.g., a silver-palladium-copper (APC) alloy), or copper (Cu) or a copper alloy (e.g., a copper-calcium (CuCa) alloy) for implementation of low resistance and fine linewidth.

In some embodiments, the sensing electrodes 110 and 130, the traces 140, and/or the antenna unit 200 may include a transparent conductive oxide, such as indium tin oxide (ITO), indium zinc oxide (IZO), indium zinc tin oxide (IZTO), or zinc oxide (ZnOx).

In some embodiments, the sensing electrodes 110 and 130, the traces 140, and/or the antenna unit 200 may include a lamination structure of a transparent conductive oxide layer and a metal layer, for example, a two-layer structure of a transparent conductive oxide layer-metal layer or a three-layer structure of a transparent conductive oxide layer-metal layer-transparent conductive oxide layer. In this case, the flexible characteristic may be enhanced by the metal layer, and the signal transmission speed may be improved by reducing the resistance, as well as the corrosion resistance and transparency may be improved by the transparent conductive oxide layer.

The sensing electrodes 110 and 130 and/or the antenna unit 200 (radiator 210) may include a blackening treated part. Accordingly, the reflectivity on the surface of the sensing electrodes 110 and 130 and/or the antenna unit 200 may be reduced, thereby decreasing pattern visibility due to light reflection.

In one embodiment, the surfaces of the metal layer included in the sensing electrodes 110 and 130 and/or the antenna unit 200 may be converted into a metal oxide or metal sulfide to form a blackening layer. In one embodiment, blackening layer(s) such as a black material coating layer or a plating layer may be formed on the sensing electrodes 110 and 130 and/or the antenna unit 200 or the metal layer. The black material or plating layer may include an oxide, sulfide, alloy, or the like containing silicon, carbon, copper, molybdenum, tin, chromium, molybdenum, nickel, cobalt, or at least one of these.

The composition and thickness of the blackening layer may be adjusted considering the reflectivity reduction effect and antenna radiation characteristics.

In one embodiment, the sensing electrodes 110 and 130 and the radiator 210 may include a mesh structure. Accordingly, it is possible to suppress the sensing electrodes 110 and 130 and the radiator 210 from being viewed by a user in the active area AA.

In one embodiment, at least a portion of the transmission line 220 may include a solid structure formed of the above-described metal or alloy. Accordingly, an increase in the resistance between the antenna unit 200 and the antenna pad 250 may be suppressed, and the power supply efficiency may be improved.

The antenna unit 200 is disposed in the active area AA and may be partially disposed in the peripheral area PA. For example, the transmission line 220 may be disposed in the peripheral area PA. In one embodiment, the transmission line 220 may extend across the active area AA and the peripheral area PA.

In one embodiment, the transmission line 220 may also share the mesh structure. The transmission line 220 may also have a partially solid structure.

In one embodiment, the sensing electrodes 110 and 130 and/or the radiator 210 may include a solid thin film transparent metal structure. Accordingly, the sensing sensitivity and emission performance may be further improved.

The touch sensor pads 150 and the antenna pads 250 may have a solid structure formed of the above-described metal or alloy. Accordingly, the bonding resistance with the circuit board 300 may be reduced.

In exemplary embodiments, the sensing electrodes 110 and 130 and the antenna unit 200 may be disposed in the same layer or at the same level. For example, the sensing electrodes 110 and 130 and the radiator 210 may be formed together in the same layer through the same patterning process to have a mesh structure.

In some embodiments, the antenna unit 200 and the traces 140 may be formed in the same layer or at the same level.

According to exemplary embodiments, the touch sensor pads 150 and the antenna pads 250 may be arranged together in the same layer or at the same level in the bonding area BA. Accordingly, antenna bonding and touch sensor bonding may be implemented together through one circuit board 300 as described below.

In some embodiments, the antenna unit 200 and the antenna pad 250 may be directly connected with each other in the same layer. Accordingly, antenna signal loss may be suppressed while reducing antenna power supply resistance.

In some embodiments, the sensing electrodes 110 and 130, the traces 140 and the touch sensor pads 150 may be directly connected with each other in the same layer. This may enhance the touch sensing sensitivity while reducing the sensing channel resistance.

As shown in FIG. 1, a plurality of antenna units 200 may be arranged in the form of array at one end adjacent to the bonding area BA of the active area AA.

The sensing electrodes 110 and 130 adjacent to the radiator 210 of the antenna unit 200 may have a reduced area compared to the other sensing electrodes 110 and 130. Accordingly, an arrangement space of the antenna unit 200 may be secured while maintaining the mutual independence of touch sensing and antenna radiation. For example, the sensing electrodes 110 and 130 adjacent to the radiator 210 may include a recess etched so that the radiator 210 is partially inserted.

FIGS. 3 and 4 are partially enlarged plan views illustrating the sensor device according to exemplary embodiments.

Referring to FIGS. 3 and 4, as described above, the antenna pads 250 and the touch sensor pads 150 may be arranged together in the bonding area BA assigned to one end of the peripheral area PA to form a pad row.

The antenna pad 250 may include a signal pad 252 and ground pads 254. The transmission line 220 of the antenna unit 200 may be connected to the signal pad 252. The ground lines 230 of the antenna unit 200 may be connected with the ground pads 254 of the antenna pad 250.

Each of the first traces 142 which are branched from the sensing channel columns may be connected to the first touch sensor pad 152. Each of the second traces 144 which are branched from the sensing channel rows may be connected to the second touch sensor pad 154.

An antenna pad unit may be defined by the antenna pads 250 connected to one antenna unit 200. For example, the antenna pad unit may be defined by the signal pad 252 and a pair of ground pads 254 facing each other with the signal pad 252 interposed therebetween.

The touch sensor pads 150 (e.g., the first touch sensor pads 152) may be disposed on both sides in the row direction of the antenna unit. According to exemplary embodiments, the ground pad 254 of the antenna pad 250 may be disposed between the touch sensor pad 150 and the signal pad 252 of the antenna pad 250.

In some embodiments, the touch sensor pad 150 (e.g., the first touch sensor pad 152) may be disposed between the adjacent antenna pad units. For example, a plurality of antenna pad units may be arranged repeatedly in the row direction with the touch sensor pad 150 interposed therebetween.

Due to the above-described pad arrangement, the interdependence mutual independence and reliability of antenna power supply/radiation through the antenna unit 200 and touch sensing through the sensing electrodes 110 and 130 may be improved. For example, interference between the antenna power supply/driving signal and the touch sensing signal may be blocked through the ground pad 254, and mutual noise may be absorbed/shielded.

In one embodiment, a reference potential or ground potential may be applied to the ground pad 254 to enhance the mutual independence of the antenna power supply/driving signal and the touch sensing signal. The reference potential or ground potential may be lower than the potential of the touch driving signal to the touch sensor pad 150 and the power supply potential to the signal pad 252, respectively.

In one embodiment, the reference potential or ground potential applied to the ground pad 254 may be substantially 0 V. For example, the supply potential may be applied to the signal pad 252, and the reference potential or ground potential may be applied to the ground pad 254 through an antenna driving IC chip 350*b* (see FIG. 8).

In some embodiments, the reference potential or ground potential may also be applied to the blocking pad 151 and/or the guard pad 153. For example, the touch driving signal potential may be applied to the touch sensor pads 152 and 154, and the reference potential or ground potential may be applied to the blocking pad 151 and/or the guard pad 153 through a touch sensor driving IC chip 370*b* (see FIG. 8).

The reference potential or ground potential applied to the blocking pad 151 and/or the guard pad 153 may be substantially the same as the reference potential or ground potential applied to the ground pad 254. In one embodiment, a reference potential of substantially 0 V may be applied to the blocking pad 151, the guard pad 153 and the ground pad 254 together.

In some embodiments, a plurality of touch sensor pads 150 may be disposed between the adjacent antenna pad units. For example, a plurality of first touch sensor pads 152 may be disposed between the adjacent antenna pad units. In this case, a plurality of first traces 142 may be disposed between the adjacent antenna units 200.

In some embodiments, one touch sensor pad 150 may be disposed between the adjacent antenna pad units. For example, one first touch sensor pad 152 may be disposed between the adjacent antenna pad units. Accordingly, a pad density in the pad row may be increased, while decreasing the number of touch sensor pads 150 sandwiched between the antenna pad units.

According to the above-described exemplary embodiments, the antenna pads 250 may be arranged together with the touch sensor pads 150 within the bonding area BA using the ground line 230 and the transmission line 220. Accordingly, the connection of the antenna driving integrated circuit (IC) chip with the antenna unit 200, and the connection of the touch sensor IC chip with the sensing electrodes 110 and 130 may be implemented together through a single circuit board 300 as described below, while increasing the pad density in the bonding area BA.

In addition, through the insertion of the ground pad 254, the independence between the antenna power supply/driving signal and the touch sensing signal may be enhanced. The ground pad 254 may be connected with the ground line 230 of the antenna unit 200 to further improve the mutual noise shielding/absorption efficiency.

In some embodiments, the reference potential or ground potential is applied through the ground pad 254 as described above, such that a ground current may be supplied through the ground line 230. Accordingly, while an independence from the touch sensing signal through the ground line 230 may be increased, the independence from the adjacent antenna unit 200 may also be increased.

The ground line 230 extends together with the transmission line 220 so as to be adjacent to the radiator 210 and may be provided as a guard line of the antenna unit 200 for the traces 140 around the antenna unit 200. The ground line 230 may also serve as a co-planar waveguide (CPW) line extending together around the transmission line 220 to facilitate electric field supply to the radiator 210.

In addition, the ground line 230 may be provided as a blocking line for parasitic capacitance generated by a potential difference between the antenna power supply signal applied through the transmission line 220 and the channel signal of the touch sensor.

The transmission line 220 and the ground line 230 have a bent line shape, respectively, thereby allowing the antenna pads 250 to be efficiently collected within the bonding area BA. For example, the transmission line 220 and the ground line 230 may include two bent portions, respectively.

In some embodiments, the transmission line 220 may have a variable width. As shown in FIG. 3, the transmission line 220 may include an extended line part 225 whose width is increased at an end adjacent to the radiator 210.

In some embodiments, the ground line 230 may also have a variable width. The ground line 230 may include an extended ground part 235 whose width is increased at an end adjacent to the radiator 210. For example, a pair of extended ground parts 235 may face each other in the row direction with the extended line part 225 interposed therebetween.

By forming the extended line part 225 and the extended ground part 235 at the ends adjacent to the radiator 210, power and signal supply to the radiator 210 may be facilitated while suppressing the antenna signal loss.

According to the embodiment illustrated in FIG. 3, all the lengths of the transmission lines 220 of the antenna units 200 may be substantially the same. In this case, it is possible to make signal phases applied to the respective antenna units 200 be uniform. Accordingly, radiation of a desired frequency band may be implemented with high reliability while suppressing the phase interference.

According to the embodiment illustrated in FIG. 4, the transmission lines 220 of the antenna units 200 may include transmission lines having different lengths from each other. In this case, the phase may be corrected from the antenna driving integrated circuit (IC) chip, thereby making the overall phase of the transmission lines be uniform.

FIG. 5 is a schematic partially enlarged plan view illustrating a sensor device according to some exemplary embodiments.

Referring to FIG. 5, an antenna unit 200 may include a plurality of transmission lines 220. For example, two transmission lines 220 may be connected to one radiator 210.

According to exemplary embodiments, a first transmission line 220a may be connected to a first corner of the radiator 210, and a second transmission line 220b may be connected to a second corner of the radiator 210. In some embodiments, the first corner and the second corner may include vertices of the radiator 210 adjacent to the bonding area BA. The first corner and the second corner may be symmetrical with respect to an imaginary center line of the radiator 210 extending in the column direction.

Accordingly, the first transmission line 220a and the second transmission line 220b may be substantially symmetrical with respect to the imaginary center line.

In some embodiments, the first transmission line 220a may extend from the first corner toward a center of the radiator 210. The second transmission line 220b may extend from the second corner toward the center of the radiator 210.

In one embodiment, the extension directions of the first transmission line 220a and the second transmission line 220b may be substantially perpendicular to each other.

Through the design of the above-described first transmission line 220a and the second transmission line 220b, dual polarization characteristics may be substantially implemented from the radiator 210.

In some embodiments, a mergence line 220c may be formed at a lower side of the radiator 210 connected to the transmission line 220. The mergence line 220c may be a solid metal line, and the first transmission line 220a and the second transmission line 220b may be connected to both ends of the mergence line 220c. The first transmission line 220a and the second transmission line 220b may also be formed of the solid metal line.

In one embodiment, the first transmission line 220a, the second transmission line 220b and the mergence line 220c may be formed as a substantial single member integrally connected with each other.

The power supply resistance from the transmission lines 220a and 220b to the radiator 210 may be reduced through the mergence line 220c, thereby preventing an impedance mismatch therebetween.

Figure 6:
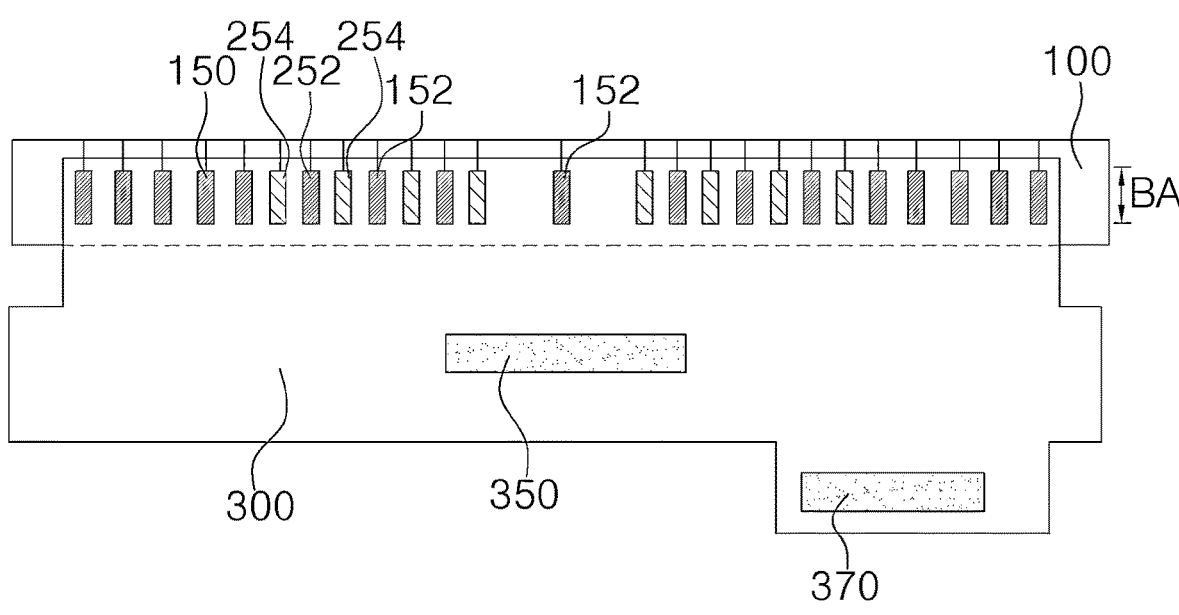
FIG. 6 is a schematic partially enlarged plan view illustrating a sensor device package according to exemplary embodiments.

FIG. 6 is a schematic partially enlarged plan view illustrating a sensor device package according to exemplary embodiments.

Referring to FIG. 6, an antenna driving circuit/antenna connection structure 350 may be electrically connected to the antenna pads 250 and a touch sensor driving circuit/touch sensor connection structure 370 may be electrically connected to the touch sensor pads 150 using a single circuit board 300.

The circuit board 300 may include a core insulation layer and conductive wirings formed on the core insulation layer. The conductive wirings may include antenna conductive wirings 310 (see FIG. 7) connected to the antenna pads 250 and touch sensor conductive wirings 320 (see FIG. 7) connected to the touch sensor pads 150. For the convenience of illustration, the conductive wirings included in the circuit board 300 are not shown in FIG. 6.

The core insulation layer may include a flexible resin such as a polyimide resin, a modified polyimide (MPI), an epoxy resin, a polyester, a cycloolefin polymer (COP), a liquid crystal polymer (LCP) and the like. In a preferred embodiment, the core insulation layer may include the polyimide resin or MPI.

The conductive wirings of the circuit board 300 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), tin (Sn), zinc (Zn), molybdenum (Mo), calcium (Ca), or an alloy containing at least one of these metals. In some embodiments, the conductive wirings may include copper or a copper alloy in consideration of signal efficiency.

In one embodiment, the circuit board 300 may be made from a copper clad laminate (CCL). The circuit board 300 may be provided as a flexible printed circuit board (FPCB).

The antenna conductive wirings 310 may be electrically connected with the antenna driving circuit/antenna connection structure 350. In one embodiment, the antenna driving circuit/antenna connection structure 350 may include an antenna connector. The antenna connector may be, for example, a board-to-board (B2B) connector. In this case, the circuit board 300 may be coupled with a chip mounting board through the antenna connector.

For example, the antenna driving circuit/antenna connection structure 350 may include an antenna driving integrated circuit (IC) chip. In this case, an antenna driving IC chip 350b may be directly mounted on the circuit board 300 through a conductive relay structure such as a solder, a conductive ball, a conductive wire and the like.

The touch sensor conductive wirings 320 may be electrically connected with the touch sensor driving circuit/touch sensor connection structure 370. In one embodiment, the touch sensor driving circuit/touch sensor connection structure 370 may include a touch sensor connector. The touch sensor connector may be, for example, a board-to-board (B2B) connector. In this case, the circuit board 300 may be coupled to the chip mounting board through the touch sensor connector.

For example, the touch sensor driving circuit/touch sensor connection structure 370 may include a touch sensor driving IC chip. In this case, the touch sensor driving IC chip 370b may be directly mounted on the circuit board 300 through the conductive relay structure such as a solder, a conductive ball, a conductive wire and the like.

Figure 7:
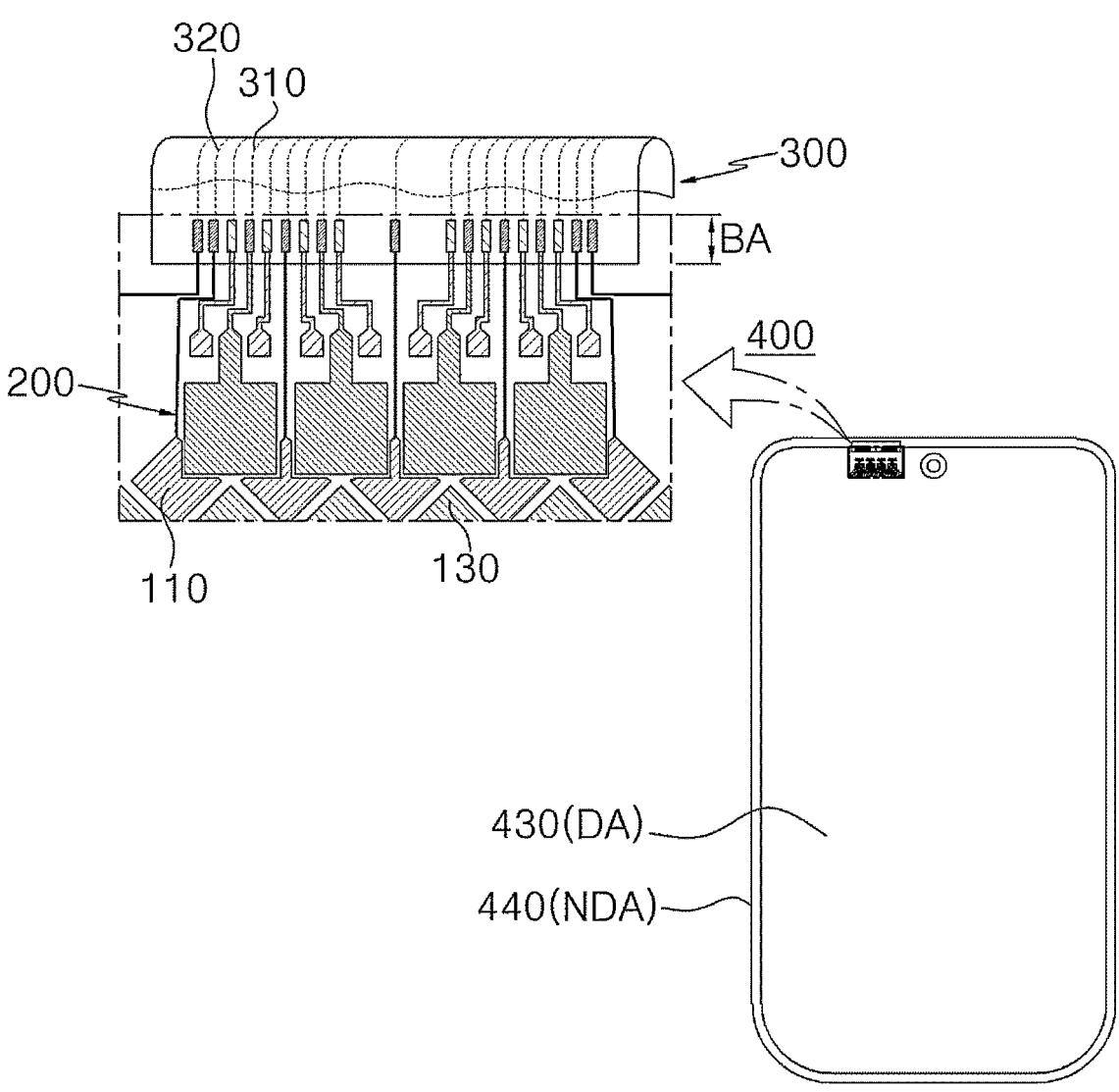
FIGS. 7 and 8 are a schematic plan view and a cross-sectional view illustrating an image display device according to exemplary embodiments, respectively.
Figure 8:
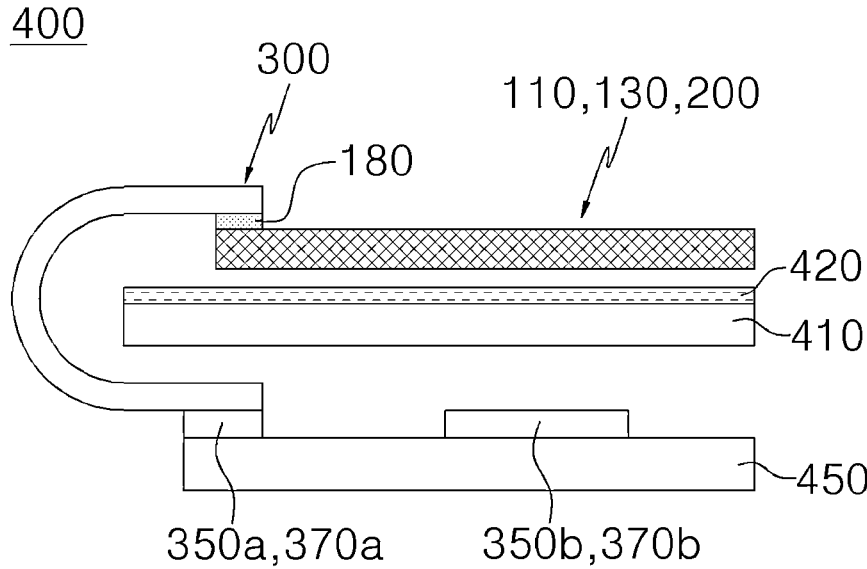

FIGS. 7 and 8 are a schematic plan view and a cross-sectional view illustrating an image display device according to exemplary embodiments, respectively.

FIG. 7 illustrates a front portion or a window surface of an image display device 400 manufactured in the form of, for example, a smart phone. The front surface of the image display device 400 may include a display area (DA) 430 and a non-display area (NDA) 440. The non-display area 440 may correspond to, for example, a light-shielding part or a bezel part of the image display device 400.

Referring to FIGS. 7 and 8, the image display device 400 may include a display panel 410 and the above-described sensor device disposed on the display panel 410.

The sensor device according to the above-described exemplary embodiments may be disposed toward the front portion of the image display device 400, and for example, may be disposed on the display panel. Accordingly, the antenna units 200 included in the sensor device may be provided as an antenna-on-display (AOD) antenna.

In some embodiments, the sensor device may be attached to the display panel in the form of a film. In some embodiments, the sensor device may be disposed across the display area 430 and the non-display area 440 of the image display device 400.

In some embodiments, the active area AA of the sensor device may be overlapped with the display area 430. In one embodiment, the sensing electrodes 110 and 130 and/or the radiator 210 may be at least partially overlapped with the display area 430.

In some embodiments, the peripheral area PA of the sensor device may be overlapped with the non-display area 440. The traces 140 and/or the transmission line 220 and the ground line 230 of the antenna unit 200 may be at least partially overlapped with the non-display area 440. For example, a portion of the sensor device having the solid structure may be overlapped with the non-display area 440.

The sensor device may be powered or driven through the circuit board 300. As described with reference to FIG. 6, the circuit board 300 is electrically connected with the antenna driving circuit/antenna connection structure 350. The antenna driving circuit/antenna connection structure 350 may include an antenna connector 350a and an antenna driving IC chip 350b. The touch sensor driving circuit/touch sensor connection structure 370 may include a touch sensor connector 370a and a touch sensor driving IC chip 370b.

For the convenience of illustration, the antenna connector 350a and the touch sensor connector 370a are shown as one connector in FIG. 8. However, as described above, the antenna connector 350a and the touch sensor connector 370a may be mounted as independent, separate members on the circuit board 300. The antenna driving IC chip 350b and the touch sensor driving IC chip 370b may also be mounted as independent, separate chips on a chip mounting board 450.

The circuit board 300 may be electrically connected with the sensor device through a bonding relay structure 180. The bonding relay structure 180 may include an anisotropic conductive film (ACF).

For example, the bonding relay structure 180 may be attached to the bonding area BA so as to entirely cover the pad row. The circuit board 300 may be disposed on the bonding relay structure 180 so that the conductive wirings 310 and 320 included in the circuit board 300 are aligned to the pads included in the pad row, respectively. Thereafter, the circuit board 300 may be bonded to the sensor device through the bonding relay structure 180 by heat pressing.

The circuit board 300 may be bent to the back portion of the image display device 400 to be connected with the driving IC chips 350b and 370b mounted on the chip mounting board 450.

For example, the antenna unit 200 and the circuit board 300 may be electrically connected with the antenna driving IC chip 350b through the antenna connector 350a. The sensing electrodes 110 and 130 of the touch sensor and the circuit board 300 may be electrically connected with the touch sensor driving IC chip 370b through the touch sensor connector 370a.

The chip mounting board 450 may be a rigid printed circuit board, and for example, may be a main board of the image display device 400.

As described with reference to FIG. 6, the antenna driving IC chip 350b and the touch sensor driving IC chip 370b may be directly mounted on the circuit board 300.

According to exemplary embodiments, the display panel 410 may further include an optical layer 420 disposed thereon. For example, the optical layer 420 may be a polarizing layer including a polarizer or a polarizing plate. In some embodiments, the sensor device may be disposed on the optical layer 420.

What is claimed is:

1. A sensor device comprising:
   touch sensing electrodes;
   traces extending from the touch sensing electrodes;
   touch sensor pads connected to the traces;
   an antenna unit disposed adjacent to the touch sensing electrodes, the antenna unit comprising a radiator, a transmission line connected to the radiator, and ground lines extending around the transmission line; and
   antenna pads forming a pad row together with the touch sensor pads, the antenna pads comprising a signal pad connected to the transmission line and ground pads connected to the ground lines,
   wherein the transmission line and the ground lines have a bent line shape, respectively.

2. The sensor device according to claim 1, wherein a pair of the ground lines face each other with the transmission line interposed therebetween.

3. The sensor device according to claim 1, wherein the transmission line comprises an extended line part whose width is increased at an end adjacent to the radiator.

4. The sensor device according to claim 1, wherein each of the ground lines comprises an extended ground part whose width is increased at an end adjacent to the radiator.

5. The sensor device according to claim 1, wherein each of the ground pads is disposed between the signal pad and the touch sensor pads.

6. The sensor device according to claim 1, wherein a plurality of antenna units are arranged in a row direction, and the signal pad and the ground pads are independently connected to each of the antenna units through the transmission line and the ground lines.

7. The sensor device according to claim 6, wherein at least one touch sensor pad among the touch sensor pads is disposed between the antenna pads connected to adjacent antenna units among the antenna units.

8. The sensor device according to claim 6, wherein a plurality of transmission lines connected to each of the plurality of antenna units have a bent line shape with the same length, respectively.

9. The sensor device according to claim 1, wherein the antenna pads and the touch sensor pads form a single pad row on the same layer.

10. The sensor device according to claim 1, wherein the transmission line of the antenna unit comprises a first transmission line and a second transmission line which extend in different directions from each other and are connected to the radiator, and
    the signal pad is connected to each of the first transmission line and the second transmission line.

11. The sensor device according to claim 1, further comprising an antenna driving integrated circuit electrically connected with the antenna unit, the antenna driving integrated circuit configured to apply a reference potential to the ground pads, and apply a power supply signal having a potential greater than the reference potential to the signal pad.

12. The sensor device according to claim 11, further comprising a blocking pad inserted between the adjacent touch sensor pads among the touch sensor pads or a guard pad disposed at an end of the pad row.

13. The sensor device according to claim 12, further comprising a touch sensor driving integrated circuit electrically connected with the touch sensor pads, the touch sensor driving integrated circuit configured to apply a reference potential to the blocking pad or the guard pad, and apply a touch driving signal having a potential greater than the reference potential to the touch sensor pads.

14. The sensor device according to claim 13, wherein the reference potential applied to the blocking pad or the guard pad and the reference potential applied to the ground pad are the same as each other.

15. The sensor device according to claim 12, further comprising a blocking line extending between adjacent traces among the traces from the blocking pad.

16. The sensor device according to claim 12, further comprising a guard line in the form of a loop extending from the guard pad and surrounding the periphery of the touch sensing electrodes.

17. An image display device comprising:
a display panel; and
the sensor device according to claim 1 arranged in the display panel.

18. A sensor device comprising:
touch sensing electrodes;
traces which extend from the touch sensing electrodes;
touch sensor pads which are connected to the traces;
an antenna unit which is disposed adjacent to the touch sensing electrodes and
comprises a radiator, a transmission line connected to the radiator, and ground lines extending around the transmission line; and
antenna pads which form a pad row together with the touch sensor pads, and comprise a signal pad connected to the transmission line and ground pads connected to the ground lines,
wherein the transmission line comprises an extended line part whose width is increased at an end adjacent to the radiator.

* * * * *